Figure 1:
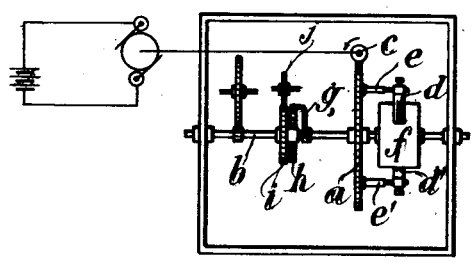

C. E. O'KEENAN.
DRIVING MEANS FOR CLOCKS.
APPLICATION FILED JAN. 14, 1911.

1,171,533.

Patented Feb. 15, 1916.

WITNESSES:
Fred White
Rene Muine

INVENTOR:
Charles Edouard O'Keenan,
By his Attorneys
Fraser, Two Myers

UNITED STATES PATENT OFFICE.

CHARLES EDOUARD O'KEENAN, OF PARIS, FRANCE.

DRIVING MEANS FOR CLOCKS.

1,171,533.   Specification of Letters Patent.   Patented Feb. 15, 1916.

Application filed January 14, 1911. Serial No. 602,731.

*To all whom it may concern:*

Be it known that I, CHARLES EDOUARD O'KEENAN, a citizen of the Republic of France, and residing at Paris, France, have invented certain new and useful Improvements in Driving Means for Clocks, of which the following is a specification.

This invention relates to a method of driving or braking by friction, applicable to clocks, striking mechanisms, chronometers, electricity meters and other apparatus.

The method is adapted for securing rotation at a constant mean speed of certain wheels in combination with a suitable escapement and with a motor the speed of which may vary within certain limits. It is also applicable for winding up a spring until the counter-force of the spring has attained a certain limit, which may be fixed as desired by a suitable adjustment of the system. The method is also applicable for the economical construction of electricity meters which register current above a certain minimum or for compensating for disturbances due to friction in a motor meter or the like. For example a clock-work driven by a small magneto electric machine, such as that described in U. S. Patent No. 641140, supplied for example with current from a dry Leclanché battery may be considered. The small motor which consumes only very little current and has a good electrical efficiency, provided that it is constructed to work with a feeble current, will run at a speed which will vary with the E. M. F. of the battery, which E. M. F. is a function of the surrounding temperature and of the degree to which the energy of the battery has diminished. If such a motor were coupled through a train of gearing with clock hands moving over a dial sub-divided into hours, the gearing being such that the long hand for example performs one revolution in an hour and the small hand one revolution in twelve hours, it will be found at the end of a comparatively short time, a day for instance, that the clock no longer indicates the time, either because of the variations of the E. M. F., or for other reasons. In fact the least variation of the E. M. F. entails a large relative variation of the time, for a variation of 1% in the speed of the motor means an error of about 15 minutes per day which is too much for a clock. If on the other hand the motor is coupled with an ordinary clock escapement, such as an escape wheel or a pendulum, through a driving mechanism constructed according to this invention, the clock will be strictly independent of the variations of the E. M. F. of the battery and may continue to go indefinitely without attention provided that the battery can supply the energy for a mean speed of rotation always above a certain critical speed.

The invention is illustrated in the accompanying drawings in which—

Figures 2, 3:
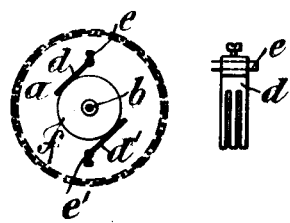
Figure 5:
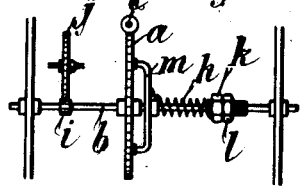
Figure 4:
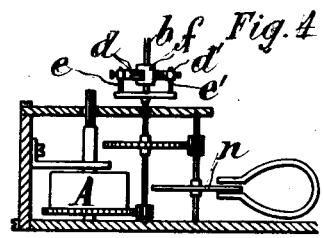
Figures 6, 7:
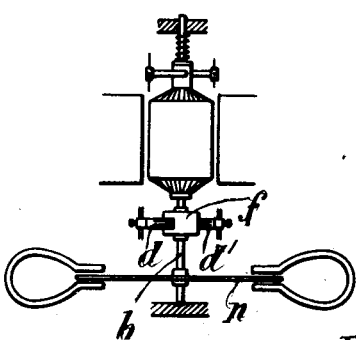
Figure 8:
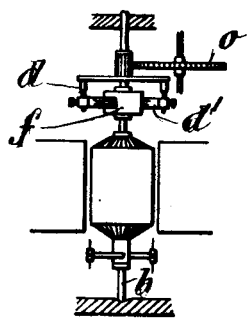

Figure 1 is a plan of part of a clock-work to which the invention is shown as applied, Fig. 2 is an end view of part of the mechanism, Fig. 3 is a detail view of the brush drawn to an enlarged scale, Fig. 4 is an elevation of a mechanism for driving a marine chronometer, Fig. 5 is a plan of a modified mechanism for driving a clock, Figs. 6, 7 and 8 are elevations of electricity meters to which the invention is applied.

Referring to Figs. 1–3, $a$ is a pinion free on a spindle $b$ and driven directly by a worm $c$ mounted on the shaft of the motor, which is not shown in the drawing. This pinion does not drive the spindle $b$ directly, but through two small metal brushes $d$, $d'$ which are rigidly connected with the pinion by metal rods $e$, $e'$. These brushes bear with the necessary pressure upon a small cylinder $f$, highly polished and made of metal or not, which is fixed to the spindle $b$. The brushes and the cylinder constitute the driving mechanism.

The brushes, driven by the pinion $a$, rub against the cylinder $f$ and tend to drive it and therefore also the spindle to which the cylinder is fixed in the direction of their movement of rotation. The spindle $b$ carries, keyed to it, a curved metal rod $g$ to which is fixed the end of a small spiral spring $h$, the other end of which is fixed to a pinion $i$ free on the spindle. Pinion $i$ is engaged by an escapement which may be a wheel escapement or a pendulum, through the intermediary of a wheel $j$; the escapement is not shown in the drawing.

When pinion $a$ turns, the cylinder $f$, spindle $b$ and rod $g$ are turned by the friction of brushes $d$, $d'$ on cylinder $f$; the spring $h$ winds up and the escapement operates in the ordinary manner, allowing the spindle $b$ to turn only at a mean angular speed; if the pinion $a$ drives the brushes $d$ $d'$ at an angular speed greater than that at which the cylinder $f$ can turn as controlled by the escapement, there is simply a relative sliding movement between the brushes $d, d'$ and the cylinder $f$.

The friction between the brushes and the cylinder is, as is known, independent of the relative speeds of the rubbing parts; this friction therefore gives rise to a driving couple which is constant in spite of any possible variation of the speed of pinion $a$ above the critical speed, and consequently spring $h$ operates at a contant mean tension. The amplitude of the oscillations of the escape wheel or pendulum, being a function of the driving couple, and therefore of the driving friction of the brushes, it is always possible, by adjusting the pressure of the brushes upon the cylinder $f$, to obtain the desired amplitude, so that the escapement operates under the best conditions indicated by theoretical considerations.

Since the spindle $b$ turns, as already stated at a constant mean speed controlled by the escapement, it is clear that the clock hands moving over a dial constructed for the purpose may be arranged so as to indicate the time, if the train of gearing connecting the spindle with the hands is suitably selected. It is only necessary that the friction of the brushes should produce a suitable couple, and that the brushes should be driven at an angular speed equal or superior to that desired for the cylinder $f$ and the spindle $b$, which is the critical speed.

Instead of two or more brushes, a single brush may suffice; the only disadvantage would be that there would not be an equal pressure of brushes on opposite sides of the spindle $b$, as when two brushes are used, but only the pressure of one brush on one side of the shaft so that the pressure of the brush would be transferred to the bearings of the spindle $b$, the consequences of which however would not be very important.

It is to be noted that in Fig. 1 the spring $h$ plays a part analogous to that of the air reservoir in a fire engine, that is to say, it gives a certain elasticity to the system during the arrests of the escapement when this does not operate continuously, as is the case with escape wheels and pendulums. But even in this case the spring $h$ is not indispensable, although generally the pressure of the spring diminishes to a certain degree the consumption of energy necessary for driving a given clock-work, by giving it greater elasticity, so that it is preferable to use the spring.

When the escapement is one operating continuously, as is the case with a fan wheel, or better with a disk or cylinder of copper moving in a powerful magnetic field, the spring $h$ is not generally necessary.

By means of a drive identical with that already described one can wind up a spring barrel which may serve, for example, to actuate an ordinary clock striking mechanism. In this case, when the spring barrel is unwound, the motor, through the brushes $d, d'$ and the cylinder $f$, winds up the spring by degrees, without any sliding of the brushes; after a certain time, however, when the spring is sufficiently wound up for the purpose in question (which may be adjusted by suitable pressure on the brushes $d, d'$ and by an appropriate train of gearing) the counter force of the spring balances the friction of the brushes and thenceforth the increase of the tension of the spring ceases and the brushes slide on the cylinder until the spring has become unwound again, for instance when the clock has struck a certain number of times; thereupon the spring winds up again by the amount necessary to recover its lost energy, whereafter sliding begins once more until the next release of the striking mechanism. In order that the rewinding of the spring may occur under economical conditions from the point of view of energy expended, it obviously suffices to provide a mean daily speed for rewinding the spring which only exceeds the mean daily speed of unwinding of the spring by a suitable amount, which may allow for the slowing up due to the drop of the E. M. F. of the battery at the end of a certain time. This mode of driving may be applied to chronometers as well as to clocks, the wheel work and the friction cylinder being generally smaller. It will be useless, therefore, to give fuller details as to chronometers, since the mechanism just described as applicable to clocks is equally applicable to chronometers. The case may be considered, however, of a ship's chronometer, the mechanism for which is represented in Fig. 4. Here a spring barrel A wound up by hand acts as the motor and through suitable gearing drives the brushes $d, d'$, the cylinder $f$ and, through the spindle $b$, the clock-work of the chronometer. The unwinding of the spring barrel is controlled by means of a disk $n$ or of a copper cylinder moving in a magnetic field, the spindle of the disk being mechanically connected with the spring barrel A by a suitable train of gearing. The variations of the speed of this brake disk $n$, which occur as the spring barrel unwinds, do not matter provided that the angular speed of the brushes is always above the critical speed.

The applications of the invention described so far by no means represent all that the invention is capable of. There are many others of which Figs. 5, 6, 7 and 8 represent some.

Fig. 5 shows a spring $h$ fixed rigidly at one end to the spindle $b$ by means of a nut $k$ held by a lock nut $l$, and at the other end to a piece $m$ which may be termed a brush and performs the function of the brushes $d$ and $d'$ of Fig. 1. This brush $m$ rubs against the wheel $a$, the function of which is similar to that of the cylinder $f$ in Fig. 1. In this construction the elasticity of the single spring $h$ supplies the place of the elasticity of the brushes $d$, $d'$ and of the spring $h$ in Fig. 1.

It will be obvious that the frictional parts, such as the cylinder, brushes, disk or the like, may turn on vertical or inclined axes in cases where such an axis is more advantageous than a horizontal axis.

Referring again to Fig. 1, it is not necessary that the brushes, $d$ $d'$ should be fixed directly to the pinion $a$; it suffices that they should be connected rigidly with this pinion whatever may be the mode of connection.

The invention may be applied to electricity meters of the kind in which the meter does not begin to register the consumption until a certain minimum consumption has been exceeded, the consumer paying a fixed sum whatever the consumption may be below this limit and an additional sum proportional to the energy consumed above this minimum.

Fig. 6 represents a Thomson meter to which the invention is applied. So long as the driving couple of the meter is lower than the frictional couple of the brushes $d$, $d'$ on the cylinder $f$, the meter does not work, but as soon as the driving couple exceeds the said frictional couple the meter begins to rotate and the apparatus registers all the consumption in excess of the minimum allowed.

As shown in Fig. 7, the brushes $d$, $d'$ may be applied to the disk $n$ of the meter or even to a separate disk if this is preferable. In the two cases last described the frictional coupling is no longer a driving device but, on the contrary, a braking device.

In Fig. 8 the invention is shown as applied to a meter for the purpose of producing a small additional driving couple designed to compensate for injurious friction. The brushes $d$, $d'$ rubbing on the cylinder $f$ are rotated around the spindle $b$ by means of a suitable train of gearing $o$, $p$. It is only necessary in this case that the angular speed of the brushes should always be higher than the maximum angular speed of the moving system of the meter in which the disturbing effect of friction is to be corrected. Since this method creates a constant driving couple, which does not vary with the electrical tension, it is more advantageous than the method commonly known as compounding which creates a couple variable with the tension of the network.

Motors for use with this frictional coupling may be of any suitable kind. For instead of a small magneto electric motor of the kind referred to above, a dynamo electric motor may be used supplied from an igniting circuit or other circuit; or, if the electric supply is an alternating one, a rotary field motor, a synchronous or an asynchronous motor may be used. Instead of an electric motor a simple spring motor may be used, or indeed any other known kind of motor. Finally the invention is adapted for transforming very simply any clock, whether controlled by a pendulum or a spring, which is to be wound periodically, into a clock which will operate automatically and for an indefinite period. It is unnecessary in view of the foregoing description to indicate how such a transformation can be made, the more so because the number of possibilities is very great. Any clock maker informed of this invention will be able to transform a clock without difficulty.

Having thus described my said invention and the best means I know of carrying the same into practical effect, I claim:—

1. A driving mechanism for clocks, comprising a driven shaft, a motor of a continuously operating type for applying power to said shaft, a friction-device between said motor and said driven shaft, said friction-device having a constant resistance value less than the value of the normal driving force of said motor, said constant resistance value of said friction-device being equal to the force necessary to produce a given constant speed of movement of mechanism driven from said driven shaft.

2. A driving mechanism for clocks, comprising a driven shaft, a motor for applying power to said shaft, a friction-device between said motor and said driven shaft, said friction-device having a constant resistance value less than the value of the normal driving force of said motor, said constant resistance value of said friction-device being equal to the force necessary to produce a given constant speed of movement of mechanism driven from said driven shaft, said friction device comprising a drum, and a flat spring brush adapted to bear upon said drum.

3. A driving mechanism for clocks, comprising a driven shaft, a motor for applying power to said shaft, a friction-device between said motor and said driven shaft, said friction-device having a constant resistance value less than the value of the normal driving force of said motor, said constant resistance value of said friction-device being equal to the force necessary to produce a given constant speed of movement of mechanism driven from said driven shaft, said friction device comprising a polished drum, and a pair of flat spring brushes adapted to bear upon said drum.

4. A driving mechanism for clocks comprising a motor-driven driving disk, a driven shaft, on which said driving disk is loosely mounted, a train of gearing and a resilient connection between said driven shaft and train of gears, a drum having a friction surface mounted on said shaft, a pair of friction brushes on said driving disk bearing on said friction drum with constant force, said brushes and drum constituting a friction couple of fixed value between said disk and driven shaft, whereby motion of said driving-disk producing a driving couple in excess of said friction couple is not transmitted to said driven shaft.

5. In mechanism for imparting a constant degree of motion to an energy-consuming device, the combination of an electric generator having a variable output, an electric motor driven by current from said generator, and a transmission mechanism comprising a driving part, a driven part, and an intermediate slip connection having a friction couple of fixed value, said generator normally driving said motor with a minimum force greater than the value of the friction couple of said intermediate slip connection, whereby the driving couple is normally greater than the said friction couple, and said intermediate slip connection permits relative movement of said driving part and driven part during normal operation of the mechanism.

6. In mechanism for imparting a constant degree of motion to an energy-consuming device, the combination of an electric generator having a variable output, an electric motor driven by current from said generator, and a transmission mechanism compriving a driving part, a driven part, and an intermediate slip connection having a friction couple of fixed value, said generator normally driving said motor with a minimum force greater than the value of the friction couple of said intermediate slip connection, whereby the driving couple is normally greater than the said friction couple, and said intermediate slip connection permits relative movement of said driving part and driven part during normal operation of the mechanism, and a resilient connection interposed between said parts constituting the friction coupling and the driven part.

7. In mechanism for imparting a constant speed of rotation to a train of clock-gears, the combination of an electric generator having a variable output, an electric motor driven by current from said generator, and a transmission mechanism comprising a driving part, a driven part, and an intermediate slip connection having a friction couple of fixed value, said generator normally driving said motor with a minimum force greater than the value of the friction couple of said intermediate slip connection, whereby the driving couple is normally greater than the said friction couple, and said intermediate slip connection permits relative movement of said driving part and driven part during normal operation of the mechanism.

8. In a device for imparting a constant speed of rotation to a train of clock-gears, the combination of an electric generator having a variable output, an electric motor driven by current from said generator, and a transmission mechanism comprising a driving part, a driven part, and an intermediate slip connection having a friction couple of fixed value, said generator normally driving said motor with a minimum force greater than the value of the friction couple of said intermediate slip connection, whereby the driving couple is normally greater than the said friction couple, and said intermediate slip connection permits relative movement of said driving part and driven part during normal operation of the mechanism, and an escapement regulating the movement of said driven part.

9. In a device for imparting a constant speed of rotation to a train of clock-gears, the combination of an electric generator having a variable output, an electric motor driven by current from said generator, and a transmission mechanism comprising a driving part, a driven part, and an intermediate slip connection having a friction couple of fixed value, said generator normally driving said motor with a minimum force greater than the value of the friction couple of said intermediate slip connection, whereby the driving couple is normally greater than the said friction couple, and said intermediate slip connection permits relative movement of said driving part and driven part during normal operation of the mechanism, an escapement regulating the movement of said driven part, and a resilient connection between said driven part and escapement.

In witness whereof I have hereunto set my hand in presence of two witnesses.

CHARLES EDOUARD O'KEENAN.

Witnesses:
 JULES ARMENGAUD EAMES,
 H. C. COXE.